United States Patent [19]
Daniel et al.

[11] Patent Number: 5,328,234
[45] Date of Patent: Jul. 12, 1994

[54] ROTATABLE SEAT FOR VEHICLES

[75] Inventors: Roger P. Daniel, Dearborn; Timothy G. Laske; John M. Maddox, both of Ann Arbor, all of Mich.

[73] Assignee: Ford Motor Company, Dearborn, Mich.

[21] Appl. No.: 979,717

[22] Filed: Nov. 20, 1992

[51] Int. Cl.⁵ .............................................. B60N 2/42
[52] U.S. Cl. ........................... 297/216.16; 297/216.18; 296/68.1
[58] Field of Search ........... 297/216.1, 216.15, 216.16, 297/216.18; 296/68.1

[56] References Cited

U.S. PATENT DOCUMENTS

| | | |
|---|---|---|
| 2,777,531 | 1/1957 | Erickson . |
| 2,873,122 | 2/1959 | Peras . |
| 3,013,837 | 12/1961 | Pessl et al. .................... 296/68.1 |
| 3,922,030 | 11/1975 | Stedman . |
| 3,927,730 | 12/1975 | Winslow . |
| 4,396,220 | 8/1983 | Dieckmann et al. . |
| 4,900,084 | 2/1990 | Forster et al. . |
| 5,000,509 | 3/1991 | Sinnhuber et al. ............ 296/68.1 X |
| 5,149,165 | 9/1992 | Woolley ............... 296/68.1 |

FOREIGN PATENT DOCUMENTS 330396  6/1930  United Kingdom .

*Primary Examiner*—Michael F. Trettel
*Attorney, Agent, or Firm*—Daniel M. Stock; Roger L. May

[57] ABSTRACT

A rotatable seat for an occupant of a vehicle includes a generally horizontal seat portion, a generally upright back portion, and a structure for rotating the seat portion and/or back portion in reaction to an impact from the side of the vehicle to place the rotatable seat between the occupant and the intruding side of the vehicle.

20 Claims, 2 Drawing Sheets

FIG 1
FIG 2
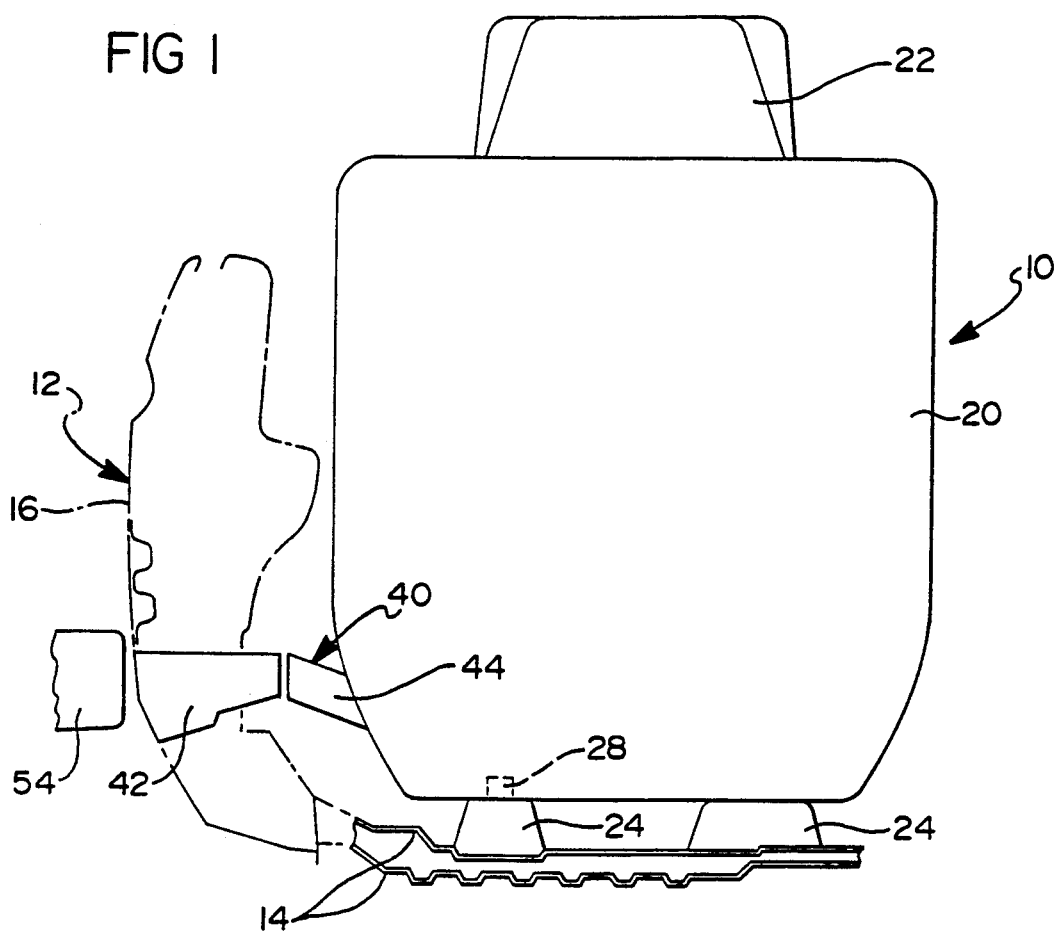
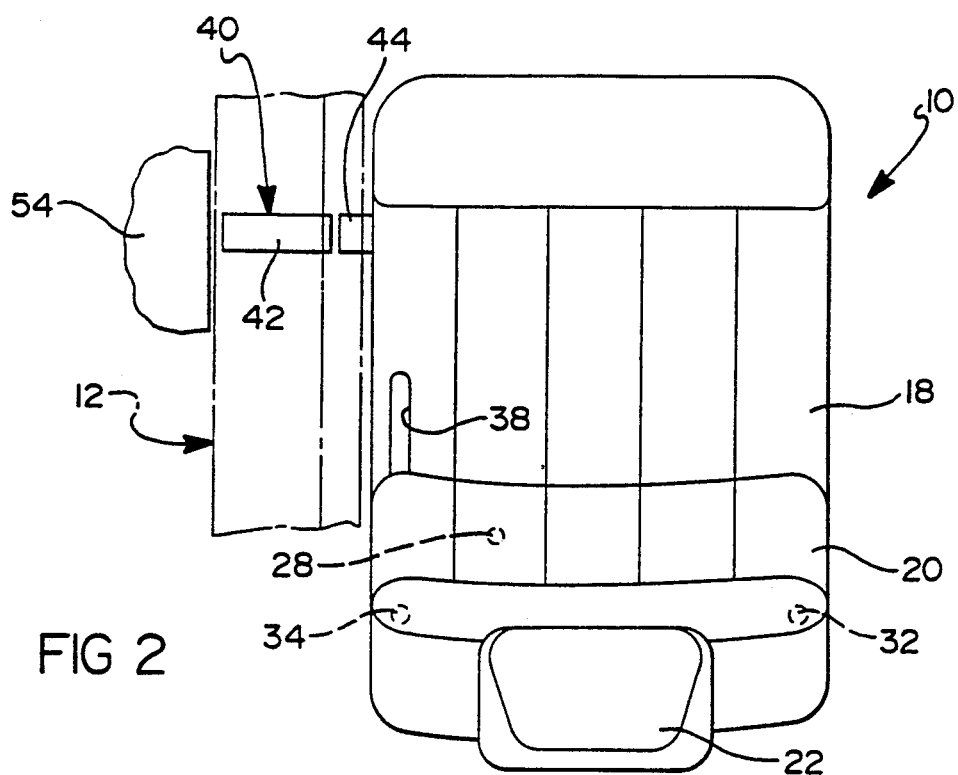

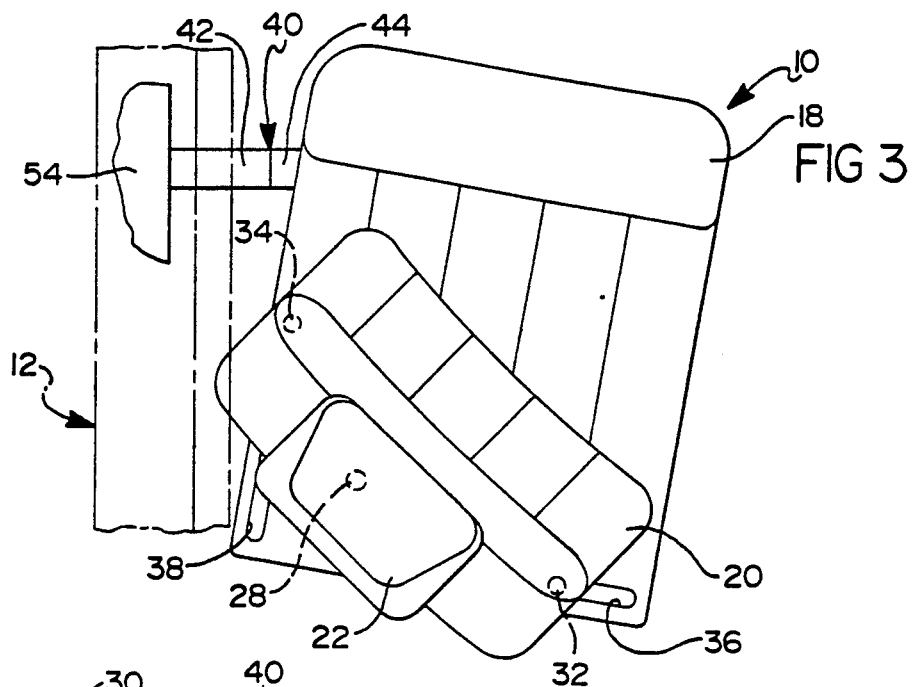
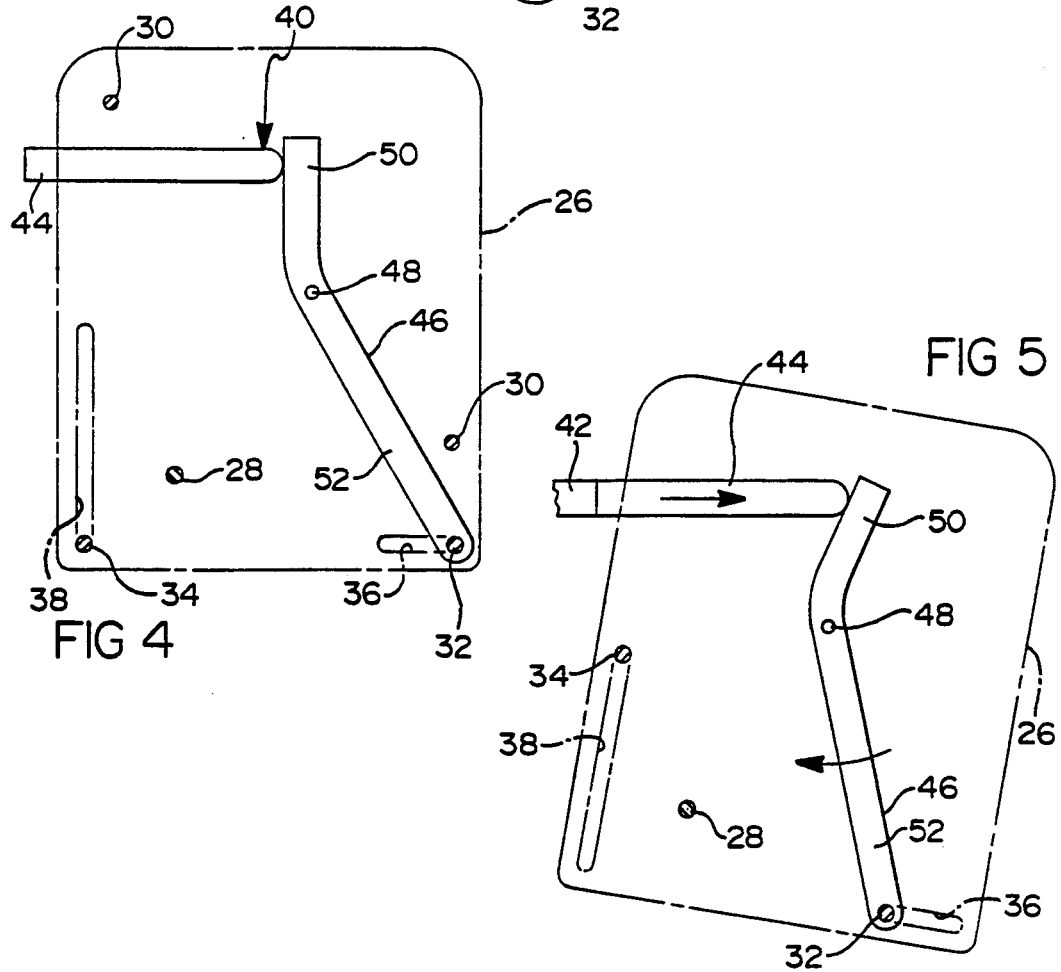

ROTATABLE SEAT FOR VEHICLES

BACKGROUND OF THE INVENTION

1. Field of the Invention

The present invention relates generally to seats for vehicles and, more particularly, to a rotatable vehicle seat to help provide protection to the occupant compartment during a side collision type impact.

2. Description of the Related Art

It is known to construct seats for occupants of vehicles such as automotive vehicles. Typically, the seats are stationary but may be adjustable forward and backward and for height and tilt. The occupant is typically restrained in the vehicle seat by conventional shoulder and lap seat belts.

It is also known that vehicles may collide with obstacles during operation. As a result, automotive vehicles have provided various structures to lessen the effects of a collision type impact on an occupant compartment of the vehicle. For example, some automotive vehicles include an air bag to lessen the effects of a frontal collision type impact. As to a side collision type impact, some automotive vehicles include a structural beam in the door. Although the above provide advantages in lessening the effects on the occupant compartment during a collision, they may allow, upon a side collision type impact, the side of the vehicle to move inward against the seat.

SUMMARY OF THE INVENTION

Accordingly, the present invention is a rotatable seat for an occupant of a vehicle including a generally horizontal seat portion and a generally upright back portion. The rotatable seat includes means for rotating at least either the seat portion or back portion in reaction to an impact from a side of the vehicle to place the rotatable seat between the occupant and the intruding side of the vehicle.

One advantage of the present invention is that a rotatable seat helps to provide protection to an occupant compartment of a vehicle during a side collision type impact. Another advantage of the present invention is that the rotatable seat is rotated upon a side collision type impact to place the seat between the occupant and the impacted side of the vehicle to absorb and spread crash energy. Yet another advantage of the present invention is that intrusion from a side impact forces the seat to rotate and partially shield the occupant from the impact with the back portion of the rotatable seat.

Other objects, features and advantages of the present invention will be readily appreciated as the same becomes better understood after reading the following description taken in light of the accompanying drawings.

BRIEF DESCRIPTION OF THE DRAWINGS

FIG. 1 is a rear elevational view of a rotatable seat, according to the present invention, illustrated in operational relationship with a vehicle partially shown.

FIG. 2 is a plan view of the rotatable seat of FIG. 1.

FIG. 3 is a view similar to FIG. 2 illustrating rotation of the rotatable seat upon a side collision type impact.

FIG. 4 is a plan view of a portion of the rotatable seat of FIGS. 1 and 2.

FIG. 5 is a view similar to FIG. 4 illustrating rotation of the rotatable seat upon a side collision type impact.

DESCRIPTION OF THE PREFERRED EMBODIMENT(S)

Turning now to the drawings and in particular to FIGS. 1 and 2 thereof, a rotatable seat 10 according to the present invention, is illustrated in operational relationship with a vehicle, generally indicated at 12, such as an automotive vehicle (partially shown). The vehicle 12 includes a floor pan 14 and a door 16. It should be appreciated that the door 16 is moveable and connected to the remaining structure of the vehicle 12 as is known in the art. It should also be appreciated that the floor pan 14 is stationary and also connected to the remaining structure of the vehicle 12 as is known in the art.

The rotatable seat 10 includes a generally horizontal seat portion 18 and a generally vertical or upright back portion 20. The rotatable seat 10 may also include a head rest portion 22 connected to the back portion 20 in a known manner. The rotatable seat 10 includes a pair of laterally spaced tracks 24 for supporting the seat portion 18 upon vehicle structure such as the floor pan 14. The tracks 24 are secured to the floor pan 14 by suitable means such as fasteners (not shown). It should be appreciated that the tracks 24 allow the rotatable seat 10 to be moved or adjusted longitudinally both forward and backward.

The seat portion 18 may include a seat pan 26 (FIGS. 4 and 5) connected to the tracks 24 by a pivot pin 28 to allow the seat portion 18 to rotate laterally relative to the floor pan 14. The seat pan 26 is also connected to the tracks 24 by at least one, preferably a plurality of shear pins 30, detents or the like. The shear pins 30 allow the seat portion 18 to be moved longitudinally along the tracks 24 but resist the seat portion 18 from rotating about the pivot pin 28 until sheared by a predetermined force. It should be appreciated that the pivot pin 28 also allows the seat portion 18 to be moved longitudinally along the tracks 24.

The back portion 20 is connected to the seat portion 18 by a pair of pins 32 and 34. Preferably, the pins 32 and 34 are located on opposed lateral sides of the back portion 20. The pins 32 and 34 extend generally vertically and are disposed in corresponding grooves or tracks 36 and 38 in the seat portion 18. Preferably, the seat pan 26 has a groove 36 extending laterally inward from one opposed side and a groove 38 extending longitudinally along the other opposed side. The pins 32 and 34 and grooves 36 and 38 allow the back portion 20 to rotate relative to the seat portion 18 and floor pan 14. It should be appreciated that the grooves 36 and 38 may include arcuate portions to allow the back portion 20 to smoothly rotate relative to the seat portion 18. It should also be appreciated that the rotatable seat 10 may include a mechanism (not shown) to move the back portion 20 from a semi-reclined position to a more upright position.

Referring to FIGS. 1 through 5, the rotatable seat 10 also includes an intrusion structure, generally indicated at 40, for rotating the seat portion 18 and back portion 20 relative to each other and the floor pan 14. The intrusion structure 40 includes a door intrusion member 42 connected to the door 16 and a seat intrusion member 44 connected to the seat portion 18. The door intrusion member 42 is connected to the door 16 by suitable means such as welding or adhesives (not shown). The door intrusion member 42 is an elongated member extending outwardly and laterally from the door 16 toward the seat portion 18. It should be appreciated that the door intrusion member 42 may be disposed behind a door trim panel (not shown) of the door 16 and the rotatable seat 10 may extend laterally to be adjacent the door trim panel.

The seat intrusion member 44 is connected to the seat pan 26 by suitable means such as welding or adhesives (not shown). The seat intrusion member 44 is an elongated member extending outwardly and laterally toward the door 16 and adjacent the door intrusion member 42. The intrusion structure 40 also includes a lever member 46 pivotally connected to the seat pan 26 by suitable means such as a pivot pin 48. The lever member 46 has a longitudinal portion 50 which abuts an end of the seat intrusion member 44 and an inclined portion 52 extending longitudinally at an angle and connected to the pin 32 of the back portion 20. It should be appreciated that the lever member 46 rotates about the pivot pin 48.

In operation, an intruding obstacle 54, such as a bumper of another automotive vehicle, may collide with the door 16 of the vehicle 12. When this occurs, the intruding obstacle 54 transmits force through the door 16 to the door intrusion member 42. The door intrusion member 42 contacts the seat intrusion member 44, thereby applying a force on the seat portion 18 and shear pins 30. When a predetermined force is acting upon the seat intrusion member 44, the shear pins 30 (or equivalent) will be sheared to release the seat portion 18. Once released, the seat portion 18 rotates about the pivot pin 28, preferably for a predetermined amount of rotation such as fifteen degrees (15°) as illustrated in FIGS. 3 and 5. Concurrently, when the door intrusion member 42 contacts the side intrusion member 44, the seat intrusion member 44 acts on the longitudinal portion 50 of the lever member 46 causing the lever member 46 to rotate about the pivot pin 48. As the lever member 46 rotates, the inclined portion 52 rotates and pulls the pin 32 along the groove 36, in turn, moving the pin 34 along the groove 38. Movement of the pins 32 and 34 along the grooves 36 and 38 rotates the back portion 20, preferably a predetermined amount of rotation such as forty-five degrees (45°) as illustrated in FIGS. 3 and 5.

Accordingly, the intrusion structure 40 forces the rotatable seat 10 to rotate due to an intrusion from a side collision type impact. The rotatable seat 10 pivots about the pivot pin 28 to partially shield the occupant from the intruding structure of the vehicle 12. The rotatable seat 10 may be configured to allow rotation of only the seat portion 18 or back portion 20 to reduce inertial forces if rotation of only one is required. Also, the rotatable seat 10 may be rotated through a sensing mechanism with pyrotechnics, springs or equivalents thereof to provide a required force to rotate the seat 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

We claim:

1. A rotatable seat for an occupant of a vehicle, comprising:
    a generally horizontal seat portion;
    a generally upright back portion; and
    means for rotating at least either one of said seat portion and said back portion about a vertical axis in reaction to an impact from a side of a vehicle to place said rotatable seat between the occupant and an intruding side of the vehicle.

2. A rotatable seat as set forth in claim 1 wherein said rotating means comprises pivotal means for allowing at least either one of said seat portion and said back portion to rotate laterally and impacting means for acting upon at least either one of said seat portion and said back portion in reaction to the intruding side of the vehicle.

3. A rotatable seat as set forth in claim 2 wherein said pivotally means comprises a pivot pin interconnecting said seat portion and vehicle structure to allow said seat portion to rotate about said pivot pin relative to the vehicle structure.

4. A rotatable seat for an occupant of a vehicle, comprising:
    a generally horizontal seat portion;
    a generally upright back portion;
    means for rotating at least either one of said seat portion and said back portion in reaction to an impact from a side of the vehicle to place said rotatable seat between the occupant and an intruding side of the vehicle;
    said rotating means comprising pivotal means for allowing at least either one of said seat portion and said back portion to rotate laterally and impacting means for acting upon at least either one of said seat portion and said back portion in reaction to the intruding side of the vehicle; and
    wherein said pivotal means comprises at least one pin extending from said back portion and means forming a groove in said seat portion, said pin being disposed in said groove for movement therealong to allow said back portion to rotate relative to said seat portion.

5. A rotatable seat for an occupant of a vehicle, comprising:
    a generally horizontal seat portion;
    a generally upright back portion;
    means for rotating at least either one of said seat portion and said back portion in reaction to an impact from a side of the vehicle to place said rotatable seat between the occupant and an intruding side of the vehicle;
    said rotating means comprising pivotal means for allowing at least either one of said seat portion and said back portion to rotate laterally and impacting means for acting upon at least either one of said seat portion and said back portion in reaction to the intruding side of the vehicle; and
    wherein said impacting means comprises a side intrusion member connecting to a side of vehicle structure and a seat intrusion member connected to either one of said seat portion and back portion and disposed adjacent said side intrusion member.

6. A rotatable seat as set forth in claim 5 wherein said seat portion includes a seat pan.

7. A rotatable seat as set forth in claim 6 including a lever member pivotally attached to said seat pan and interconnecting said seat intrusion member and said back portion.

8. A rotatable seat as set forth in claim 1 including means for resisting rotation of said rotatable seat until a predetermined force is acting on said rotatable seat.

9. A rotatable seat for an occupant of a vehicle, comprising:
a generally horizontal seat portion;
a generally upright back portion;
means for rotating at least either one of said seat portion and said back portion in reaction to an impact from a side of the vehicle to place said rotatable seat between the occupant and an intruding side of the vehicle;
means for resisting rotation of said rotatable seat until a predetermined force is acting on said rotatable seat; and
wherein said resisting means comprises at least one shear pin interconnecting said seat portion and vehicle structure.

10. A rotatable seat for an occupant of a vehicle, comprising:
a generally horizontal seat portion;
a generally upright back portion;
pivotal means for allowing said seat portion and said back portion to rotate laterally about a vertical axis; and
impacting means for acting upon either one of said seat portion and said back portion in reaction to an impact from a side of the vehicle to place said rotatable seat between the occupant and an intruding side of the vehicle.

11. A rotatable seat as set forth in claim 10 including a pair of tracks interconnecting said seat portion and vehicle structure to allow said seat portion to be moved longitudinally.

12. A rotatable seat for an occupant of a vehicle, comprising:
a generally horizontal seat portion;
a generally upright back portion;
pivotal means for allowing said seat portion and said back portion to rotate laterally;
impacting means for acting upon either one of said seat portion and said back portion in reaction to an impact from a side of the vehicle to place said rotatable seat between the occupant and an intruding side of the vehicle;
a pair of tracks interconnecting said seat portion and vehicle structure to allow said seat portion to be moved longitudinally, and
wherein said pivotal means comprises a pivot pin interconnecting said seat portion and at least one of said tracks to allow said seat portion to rotate about said pivot pin.

13. A rotatable seat as set forth in claim 12 wherein said pivotal means further comprises at least one back pin extending from said back portion and means forming a groove in said seat portion, said back pin being disposed in said groove for movement therealong to allow said back portion to rotate relative to said seat portion.

14. A rotatable seat as set forth in claim 13 wherein said seat portion includes a seat pan.

15. A rotatable seat as set forth in claim 14 wherein said impacting means comprises a side intrusion member connected to a side of vehicle structure and a seat intrusion member connected to said seat pan and disposed adjacent said side intrusion member.

16. A rotatable seat as set forth in claim 15 wherein said impacting means further comprises a lever member interconnecting said seat intrusion member and said back pin.

17. A rotatable seat as set forth in claim 16 including second pivot means interconnecting said seat pan and said lever member for allowing said lever member to rotate.

18. A rotatable seat as set forth in claim 17 including shear means for resisting rotation of said seat portion until a predetermined force is acting on said seat portion.

19. A rotatable seat as set forth in claim 18 wherein said shear means comprises at least one shear pin interconnecting said seat pan and at least one of said tracks.

20. A rotatable seat for an occupant of a vehicle, comprising:
a generally horizontal seat portion having a seat pan;
a generally upright back portion;
a pair of tracks interconnecting said seat pan and vehicle structure to allow said seat portion to be moved longitudinally;
a pivot pin interconnecting said seat pan and at least one of said tracks to allow said seat portion to rotate about said pivot pin;
a pair of back pins extending from said back portion and means forming a pair of grooves in said seat pan, said back pins being disposed in said grooves for movement therealong to allow said back portion to rotate relative to said seat portion;
a side intrusion member connected to the side of vehicle structure and a seat intrusion member connected to said seat pan and disposed adjacent said side intrusion member;
a lever member interconnecting said seat intrusion member and one of said back pins;
a second pivot pin interconnecting said seat pan and said lever member to allow said lever member to rotate; and
at least one shear pin interconnecting said seat pan and at least one of said tracks for resisting rotation of said seat portion until a predetermined force is acting on said seat portion.

* * * * *